C. L. COOKSON.
ROTARY VALVE FOR INTERNAL COMBUSTION ENGINES.
APPLICATION FILED AUG. 21, 1911.

1,061,599.

Patented May 13, 1913.

Witnesses
Frank R. Glover
H. C. Rodgers

Inventor
C. L. Cookson
By George E. Thorp Atty.

UNITED STATES PATENT OFFICE.

CHARLES L. COOKSON, OF KANSAS CITY, MISSOURI.

ROTARY VALVE FOR INTERNAL-COMBUSTION ENGINES.

1,061,599. Specification of Letters Patent. Patented May 13, 1913.

Application filed August 21, 1911. Serial No. 645,067.

*To all whom it may concern:*

Be it known that I, CHARLES L. COOKSON, a citizen of the United States, residing at Kansas City, in the county of Jackson and State of Missouri, have invented certain new and useful Improvements in Rotary Valves for Internal-Combustion Engines, of which the following is a specification.

This invention relates to rotary valves for internal combustion engines, and has for its object the production of an efficient and reliable valve of this character whereby provision is made for the complete evacuation of the burned gases from the cylinder and thorough and complete separation or isolation of the inlet and exhaust ports to effectually guard against the possibility of backfiring or the contamination of the supply of gas for the cylinder.

A further object is to produce a rotary valve composed of two separable members of such arrangement that the exhaust member may be readily removed to facilitate the removal of carbon therefrom.

Another object of the invention is to produce a rotary valve composed of two separable members so arranged that the exhaust member may be made of much larger diameter than the inlet member to permit the exhaust port to have sufficient area to give more freedom for and therefore a quicker exhaust action than is possible where the two members are of integral formation.

With these general objects in view, the invention consists in certain novel and peculiar features of construction and organization as hereinafter described and claimed; and in order that it may be fully understood reference is to be had to the accompanying drawing, in which—

Figure 1:
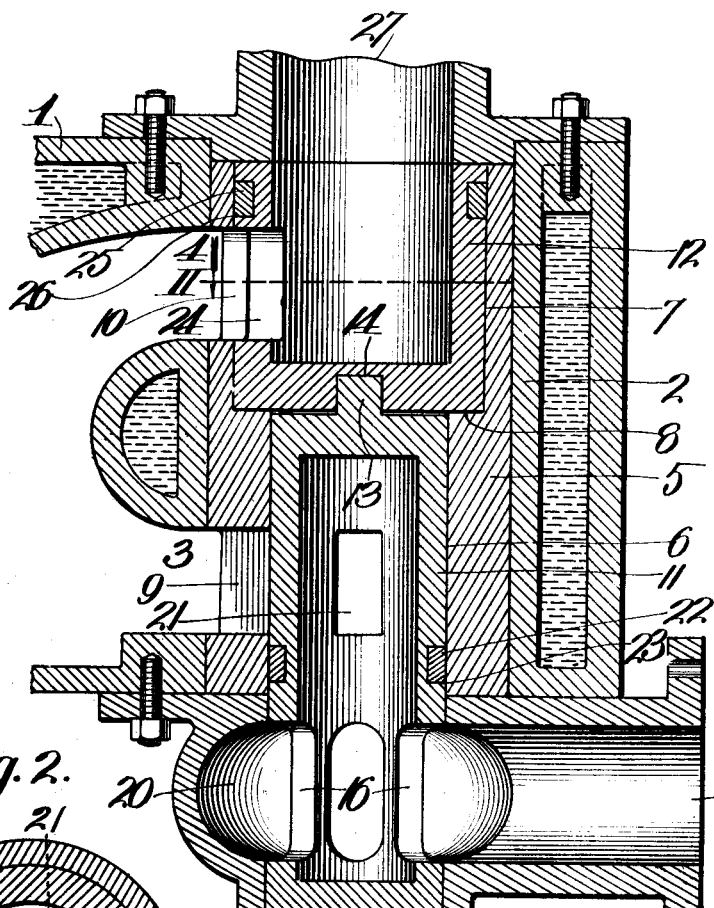
Figure 2:
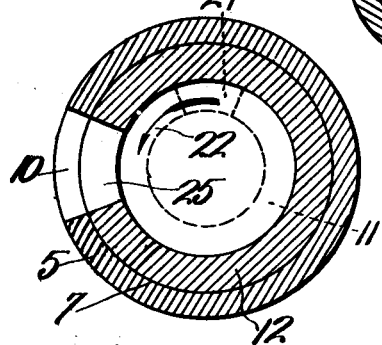
Figure 3:
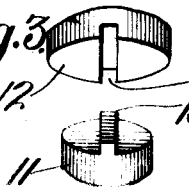

Figure 1, is a vertical section of a part of an internal combustion engine equipped with a rotary valve embodying my invention. Fig. 2, is a section on the dotted line II of Fig. 1. Fig. 3, is a detail perspective view of the interlocking end portions of the two members of the valve.

Referring now to the drawing, 1 indicates part of a cylinder of an engine, and 2 the valve casing thereof, provided with vertically-alined inlet and exhaust ports 3 and 4, respectively, and a bushing or lining 5, preferably of cylindrical form, as shown. The bore 6 of the lower part of the lining is of smaller diameter than the bore 7 of the upper part, and an upwardly-disposed horizontal annular shoulder 8 is formed at the junction of the bores. The bushing or lining is provided with a port 9, communicating with the inlet port 3, of the cylinder, and with a port 10, communicating with the exhaust port of the cylinder.

The valve consists of two cylindrical members 11 journaled in bore 6, and 12 journaled in bore 7, of the bushing; the former having a cross rib 13 projecting from its upper end into a recess or groove 14, in the bottom of member 12, this arrangement compelling both to turn together, it being preferred that member 12, shall rest on the shoulder 8, as a precaution against fresh gas escaping by way of the exhaust port or the occurrence of cross-firing from one port to the other, it being manifest that either eventuality is impossible because of the tortuous course which the gas or flame would have to follow.

The member 11, hereinafter termed the inlet member of the valve, is provided at its lower end with a stem 15, for connection in any suitable manner with means (not shown) for rotating it, and below the bushing or lining with one or more openings 16, the member from a point just above said opening or openings 16, being journaled in a casting 18, having a gas-supply passage 19 leading to a chamber 20, surrounding the valve member and communicating with the said opening or openings 16.

In the horizontal plane of ports 3 and 9, the inlet member is provided with a port 21, adapted once in each revolution to register with said ports 3 and 9, and between said port 21 and casting 18, a packing ring 22, forms a gas-tight joint between said member and the bushing or lining, the ring preferably occupying a circumferential groove 23, in the member. The exhaust member in the horizontal plane of ports 4 and 10, is provided with a port 24, for registration once in each revolution with said ports 4 and 10, and above said port 24, a gas-tight joint is established by the interposition of a packing ring 25, between the said member and the bushing or lining, the ring preferably fitting in a circumferential groove 26 in the member. The upper end of the exhaust member opens into an exhaust pipe or manifold 27 secured upon the casing.

The ports 21 and 24 are so proportioned and arranged that—where the crank-shaft (not shown) make two revolutions to one of the valve—one-eighth of the circumference of the valve intervenes between the rear wall of port 24 and the front wall of port 21, in order that the suction stroke of the piston (not shown) immediately following the exhaust stroke, shall effect the charging of the cylinder with fresh gas, the compression and ignition strokes following the order named, as usual, before the exhaust port again registers with the ports 4 and 10.

Owing to the sectional construction of the valve it is possible to employ an exhaust member of ample size to insure the full and complete scavenging of the cylinder and to provide a path through the bushing or lining so tortuous and of such length that danger of cross-firing is entirely eliminated, as hereinbefore stated. Such construction also provides for the easy and quick removal of the exhaust member for the removal of carbon therefrom, it being unnecessary to frequently remove the inlet member as the gasolene mixture passing through it is dampened and washes off the carbon, such mixture also acting as a lubricant for said member.

In the event the valve is employed to supply a plurality of cylinders, the supply of gas for all of them will be through passage 19 and openings 16 to the inlet member and thence in succession to the various cylinders, the dead gases passing off from the cylinders through the upper member of the valve and the pipe or manifold 27.

From the above description it will be seen that I have produced a rotary valve for internal combustion engines embodying the features of advantage enumerated as objectives and which is susceptible of modification within the scope of the appended claims.

I claim:

1. A rotary valve, comprising a casing having an inlet port and an exhaust port, a bushing fitting in and terminating short of the upper end of the casing and of increased internal diameter in a plane above the inlet port, and provided with an inlet port and an exhaust port registering respectively with the corresponding ports of the casing, an exhaust pipe secured upon and depending into the casing and engaging the upper end of the bushing, and a valve journaled in the bushing, consisting of superposed inlet and exhaust members detachably interlocked together at their adjacent ends, with the exhaust port member resting at its lower end upon the bushing at the upper end of the portion thereof of smallest internal diameter, the inlet port member being hollow and having a port to register at regular intervals with the inlet port of the bushing, and the exhaust port member being of cup-form and communicating at its upper end with said pipe and having a port to register at regular intervals with the exhaust port of the bushing.

2. A rotary valve, comprising a casing having an inlet port and an exhaust port, a bushing fitting in and terminating short of the upper end of the casing and of increased internal diameter in a plane above the inlet port, and provided with an inlet port and an exhaust port registering respectively with the corresponding ports of the casing, an exhaust pipe secured upon and depending into the casing and engaging the upper end of the bushing, a valve journaled in the bushing, consisting of superposed inlet and exhaust members detachably interlocked together at their adjacent ends, with the exhaust port member resting at its lower end upon the bushing at the upper end of the portion thereof of smallest internal diameter, the inlet port member being hollow and having a port to register at regular intervals with the inlet port of the bushing, and the exhaust port member being of cup-form and communicating at its upper end with said pipe and having a port to register at regular intervals with the exhaust port of the bushing, a packing ring fitting around the inlet port member of the valve below the plane of the inlet port of the bushing, and a packing ring fitting around the exhaust port member of the valve above the exhaust port of the bushing.

In testimony whereof I affix my signature, in the presence of two witnesses.

CHARLES L. COOKSON.

Witnesses:
 HELEN C. RODGERS,
 G. Y. THORPE.